Figure 12:
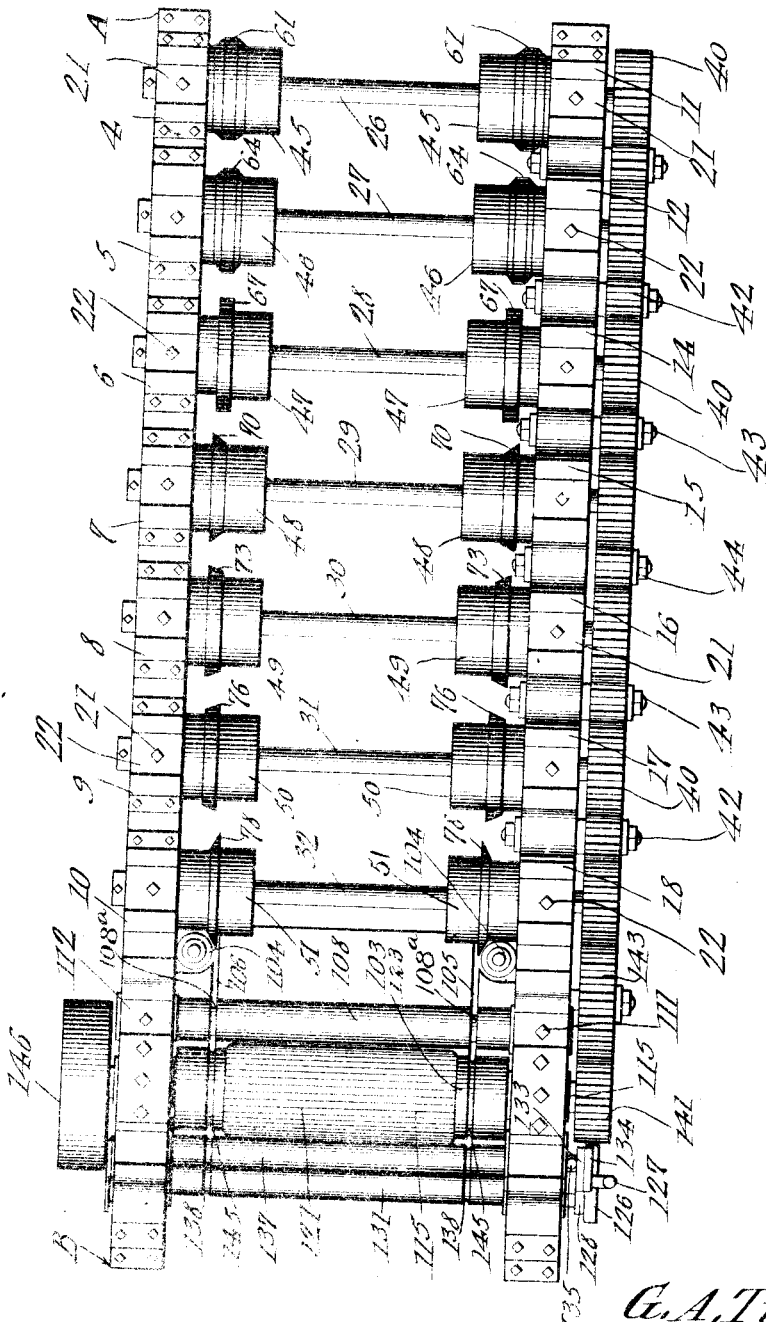

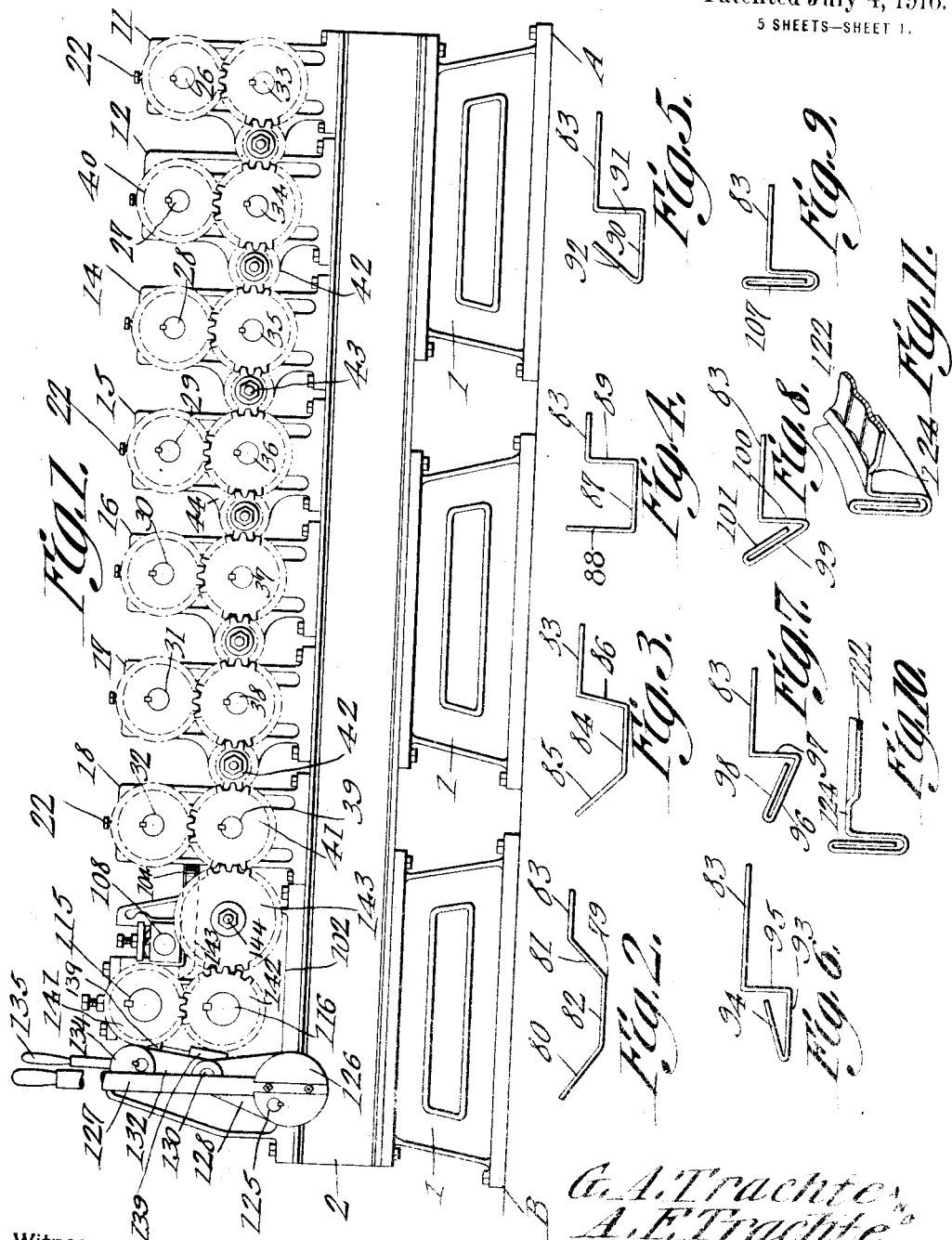

G. A. & A. F. TRACHTE.
CORRUGATING MACHINE.
APPLICATION FILED DEC. 7, 1914.

1,189,885.

Patented July 4, 1916
5 SHEETS—SHEET 2.

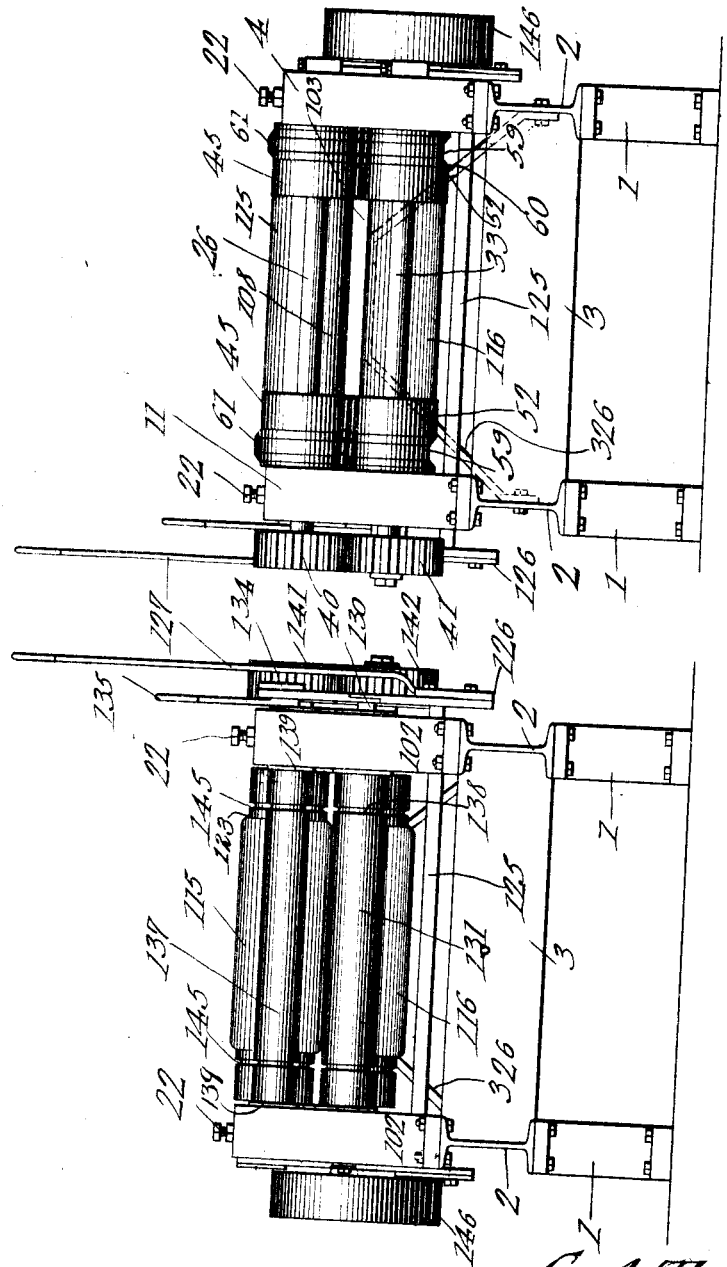

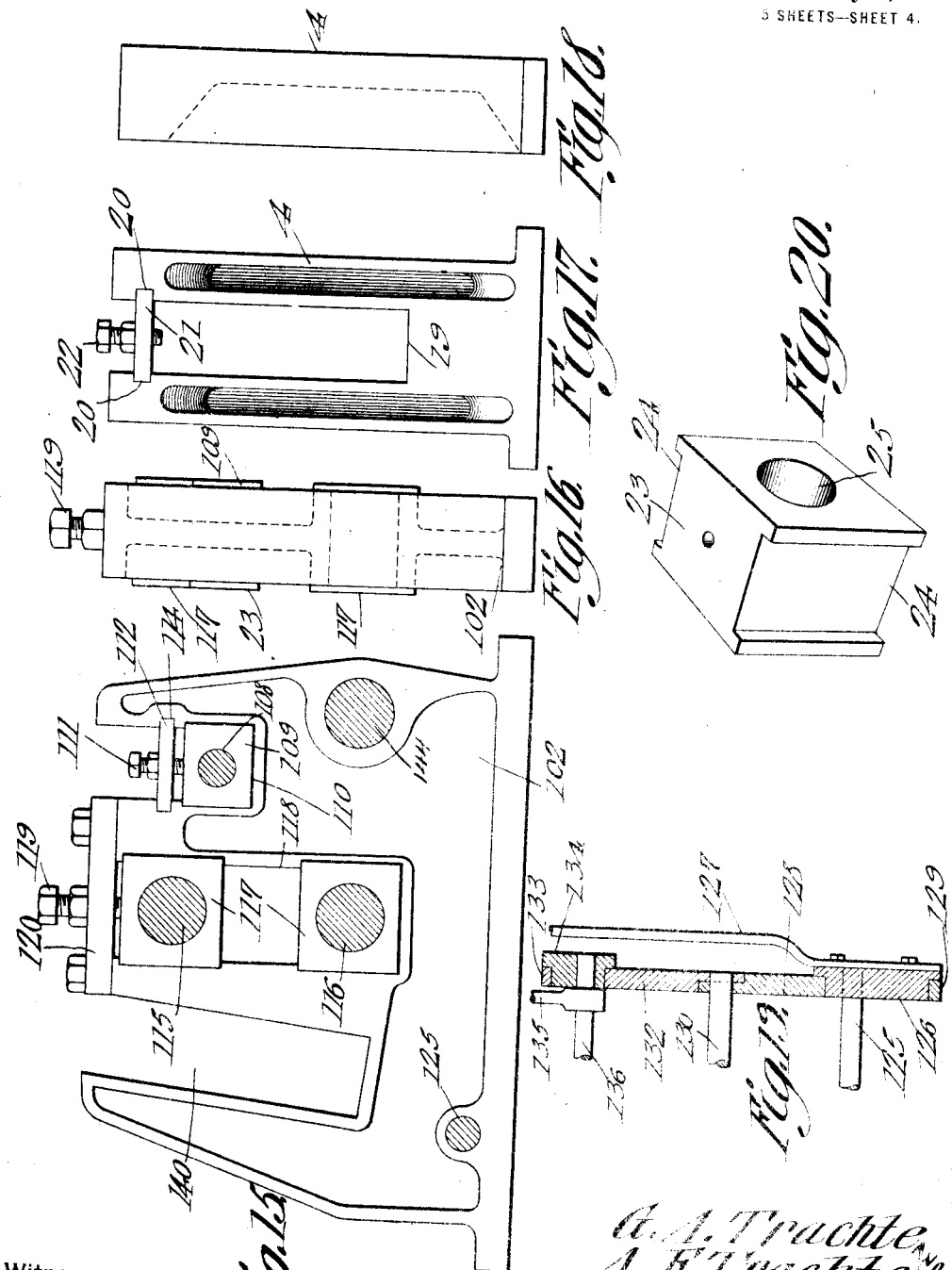

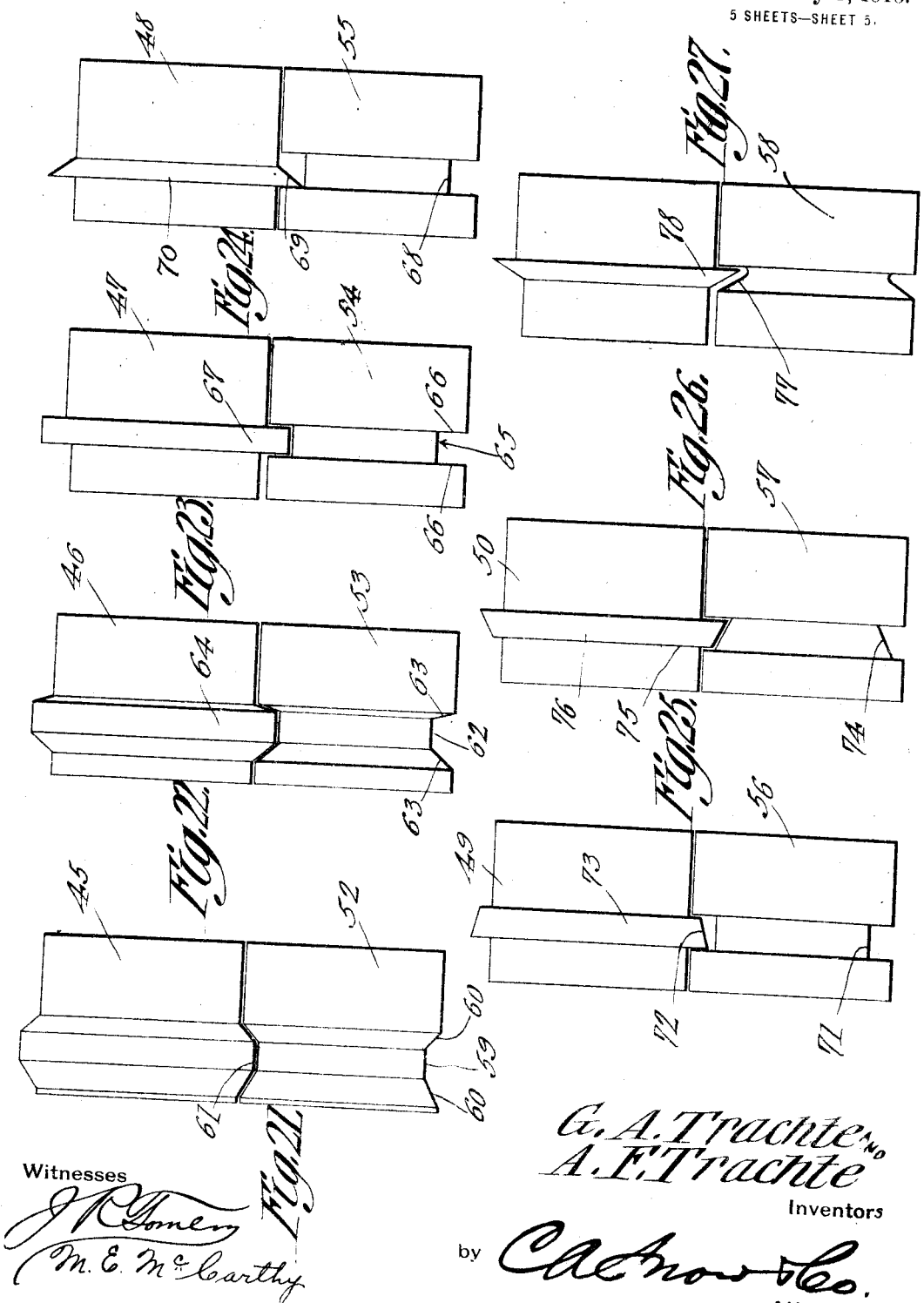

UNITED STATES PATENT OFFICE.

GEORGE A. TRACHTE AND ARTHUR F. TRACHTE, OF MADISON, WISCONSIN.

CORRUGATING-MACHINE.

1,189,885.    Specification of Letters Patent.    Patented July 4, 1916.

Application filed December 7, 1914. Serial No. 875,887.

*To all whom it may concern:*

Be it known that we, GEORGE A. TRACHTE and ARTHUR F. TRACHTE, citizens of the United States, residing at Madison, in the county of Dane and State of Wisconsin, have invented a new and useful Corrugating-Machine, of which the following is a specification.

The device forming the subject matter of this application is adapted to be employed for shaping metal so that the same may enter into the construction of stock tanks, garbage pails and the like.

The machine herein disclosed shapes that portion of the metal which forms the upright side wall of the receptacle.

The invention aims to provide novel means for fashioning a bead along the edge of the strip, which bead may be employed for receiving the bottom of the receptacle.

Another object of the invention is to provide novel means whereby the sheet may be corrugated after the bead has been formed, the corrugations extending at right angles to the plane defined by the bead in the completed product.

Another object of the invention is to provide novel means for moving the shaping rolls with respect to each other, and with respect to the vertical, the shaping rolls receiving the material after the same has been beaded and corrugated, the shaping rolls altering the contour of the product, finally, in a manner to be determined by the contour of the finished tank or receptacle, that is, whether the tank or receptacle is to be of circular outline, of flat side form, or a combination of the above.

The invention aims to provide novel means whereby the bead is formed partially by a plurality of bead forming rolls operating in one plane, the bead being finally turned up by another roll, operating in a different plane and engaging the bead as the sheet of which the bead forms a part, passes onto a supporting platform, prior to the corrugation of the sheet.

The invention aims to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made without departing from the spirit of the invention.

In the accompanying drawings: Figure 1 shows the invention in side elevation; Figs. 2 to 11 both inclusive are fragmental views depicting various stages in the manufacture of the product as carried out on the present machine; Fig. 12 shows the complete machine in top plan; Fig. 13 is an end elevation; Fig. 14 is an elevation showing the opposite end of the structure from that depicted in Fig. 13; Fig. 15 is a sectional detail showing one of the frame plates in elevation; Fig. 16 is an end elevation of the plate shown in Fig. 15; Fig. 17 is a side elevation of one of the roll carrying standards; Fig. 18 is an elevation of the structure shown in Fig. 17, the view point in Fig. 18 being at right angles to the view point in Fig. 17; Fig. 19 is a fragmental vertical section illustrating a portion of the means whereby the guiding rolls are controlled; Fig. 20 is a perspective view delineating one of the bearing boxes; Figs. 21 to 27 both inclusive are fragmental elevations showing the different sorts of rolls employed for carrying out those steps delineated in Figs. 2 to 8 both inclusive.

In Figs. 1 and 12 of the drawings, the forward end of the machine has been indicated by the reference character A, the rear end of the machine being indicated by the reference character B.

In putting the present invention into practice, two parallel lines of supports 1 are provided, the lines of supports 1 upholding, respectively, longitudinal I-beams 2 connected by cross braces 3. The foregoing will be found to be a secure and satisfactory foundation for the working parts of the structure, but, obviously, any suitable foundation may be provided.

Erected on one of the I-beams 2 is a series of standards denoted by the numerals 4, 5, 6, 7, 8, 9 and 10. Erected on the other I-beam 2 is a series of standards denoted by the numerals 11, 12, 14, 15, 16, 17 and 18. Noting Fig. 17 which depicts many common features of all of the standards, it is to be observed that the standards are provided with guide slots 19. In the standards adjacent their upper ends, transverse notches 20 are formed, the notches 20 receiving thrust plates 21 into which are threaded screws 22 controlling the movement of bearings 23, grooved as indicated at 24 to coöperate with the standards. The bearings 23 are provided with openings 25. The bearings 23 in each standard form supports for shafts to be described hereinafter, and in order to avoid lengthy description, the shafts will be described merely in connection with the standards in which they are mounted, it being understood that the several shafts to be described are carried by the bearings above alluded to.

The standards 4 and 11 carry an upper shaft 26. An upper shaft 27 is carried by the standards 5 and 12. The standards 6 and 14 carry an upper shaft 28. An upper shaft 29 coacts with the standards 7 and 15. The standards 8 and 16 carry an upper shaft 30 and an upper shaft 31 is carried by the standards 9 and 17. The standards 10 and 18 carry an upper shaft 32.

As shown in Fig. 1, the several pairs of standards carry lower shafts 33, 34, 35, 36, 37, 38 and 39. The upper shafts 26, 27, 28, 29, 30, 31 and 32 carry gear wheels 40 meshing into gear wheels 41, carried by the lower shafts 33, 34, 35, 36, 37, 38 and 39. The gear wheels 41 on the respective lower shafts are connected with each other by means of idle pinions 42 mounted on shafts 43 carried by lugs 44 forming parts of the standards 11, 12, 14, 15, 16 and 17.

Noting Fig. 12 and comparing the same with Figs. 21 to 27 both inclusive, the upper shafts 26, 27, 28, 29, 30, 31 and 32 carry, respectively, rollers 45, 46, 47, 48, 49, 50 and 51. The lower shafts 33, 34, 35, 36, 37, 38 and 39 carry, respectively, rollers 52, 53, 54, 55, 56, 57 and 58, the rollers upon the upper and lower shafts being adapted to coöperate in pairs as clearly shown in Figs. 21 and 27 of the drawings.

The roller 52 is provided with a groove 59, the walls 60 of which flare as they extend outwardly. On the roller 45 and coöperating with the groove 59 is a rib 61 shaped to conform to the groove. In the roller 53 there is a groove 62, the walls 63 of which are inclined with respect to the base of the groove. The walls 63 of the groove 62, however, slant more abruptly with respect to the base of the groove than do the walls 60 of the groove 59. On the roller 46 there is a rib 64 shaped to fit in the groove 62. The groove 65 in the roller 54 is of rectangular transverse section, the walls 66 thereof being parallel to each other. A rib 67 on the roller 47 fits into the groove 68 and is of rectangular form. The groove 68 in the roller 55 is of rectangular cross section. The rib 70 on the roller 48 projects into the groove 68, the edge of the rib 70 being beveled off as shown at 69. The groove 71 in the roller 56 is of rectangular form and one edge 72 of the rib 73 on the roller 49 is beveled off. The edge 72 approaches more nearly to parallelism with the base of the groove 71 than does the edge 69 in Fig. 24. The base of the groove in the roller 57 slants as shown at 74, and the edge 75 of the rib 76 on the roller 50 slants in an opposite direction, that is, the rib 76 and the grooved portion 74 of the roller 57 are in the form of the truncated cones, the smaller ends of which point in opposite directions. In the case of the roller 58, the slanting face of the groove is shown at 77 and the rib on the roller 51 is shaped accordingly as shown at 78. The parts 77 and 78 in Fig. 27 define a more acute angle with respect to the axes of the respective rollers than do the corresponding parts in Fig. 26.

Referring to Figs. 2 to 8 both inclusive and noting particularly Fig. 2, it will be observed that upon one or both edges of the sheet there is formed a trough 79 the walls 80 and 81 of which converge, the body portion of the sheet being indicated at 83 and the numeral 82 indicating the base of the trough 79. The bead is of the form shown in Fig. 2 after the sheet has passed by the first set of rollers, that is, by the rollers 45 and 52. The part 82 extends approximately parallel to the part 83. By means of the rollers 46 and 53, the bead is then shaped as shown in Fig. 3. The base 84 of the bead remains parallel to the body 83, but the walls 85 and 86 are brought more nearly into parallelism with each other. Fig. 4 shows the bead after the same has been operated on by the rollers 47 and 54. The base 87 of the bead remains parallel to the body portion 83 of the sheet, the walls 88 and 89 being brought into parallelism. The rollers 48 and 55 dispose the parts as shown in Fig. 5. The base 90 of the bead is still parallel to the body portion 83 of the sheet, but the lip or wall 92 has been pressed inwardly at its free edge, toward the wall 91, this operation having been brought about by the part 69 in Fig. 24. Fig. 6 shows the bead as the same appears after the material has been operated on by the rollers 49 and 56 of Fig. 25. The parts 95 and 93 stand at right angles to each other, but the lip 94 has now been bent over so that it overhangs the part 93 to a marked and perceptible extent. The material then passes between the rollers 50 and 57 of Fig. 26, the coöperating parts 75 and 74 serving to spring the base 96 outwardly, as shown in Fig. 7, and, to compact the lip 98 on the base 96. These parts now define an acute angle with respect to the portion 97 of the bead. By the coaction between the parts 78 and 77 of Fig. 27, the elements 99 and 101 of Fig. 8 have been bent still further so that they define a more acute angle with respect to the wall 100. From the foregoing it will be seen that the bead has been partially shaped and has been brought into the condition shown in Fig. 8 of the drawings.

Fixed to and upstanding from the side beams 2 near the rear end thereof are frame plates 102, one of which is shown in Fig. 15. Extended between the frame plates 102 is a platform 103 which is not centrally disposed and supported upon beams 5-6 connected with the I beams 2. After the bead has been formed in the sheet to the extent indicated in Fig. 8, the sheet passes onto the platform 103, the platform 103 being provided with grooves 105 and 106 which serve to receive partially completed beads. Journaled on the platform 103 and located near to the grooves 105 and 106 are horizontal rollers 104. The horizontal rollers as the sheet is advanced, engage the parts 99 of Fig. 8 and swing the same upwardly, until the parts 99 and 101 of Fig. 8 stand in rectangular relation to the body portion 85 of the plates, as shown at 107 in Fig. 9. The bead is now completed as shown in Fig. 9, and the bead, or beads, if two are formed, traverse the grooves 105 and 106 in the platform 103, as the sheet is advanced to the corrugating mechanism to be described hereinafter. The sheet is held down onto the platform 103 by means of an idle roller 108 extended transversely of the platform. The roller 108 is journaled in bearings 109 adjustably mounted in uprights 110 on the frame plates 102 and is circumferentially grooved as shown at 108ᵃ above the grooves 105 and 106 in the platform 102. The bearings 109 are adjusted by means of screws 111 threaded into thrust plates 112 terminally received in notches 113 in the frame plates. The corrugation indicated at 122 in Figs. 10 and 11 is put into the sheet by means of a pair of corrugated rollers 115 and 116. These rollers 115 and 116 are terminally journaled in bearings 117 mounted to slide in guide slots 118 in the frame plates 102. The relative positions of the bearings 117 and consequently of the rollers 115 and 116 are adjusted by screws 119 threaded into thrust plates 120 mounted in notches in the frame members. As clearly shown in the detail in Fig. 13. The corrugated portion 121 of the rollers 115 and 116 form the corrugations 122 of Figs. 10 and 11. The rollers 115 and 116 are provided with circumscribing grooves 123. These grooves serve to receive the bead on the sheet, while the sheet is being corrugated by the elements 121. Between the grooves 123 and the corrugations 121 on the rollers, the rollers are smooth as shown at 122. Thus, as shown at 124 in Fig. 11, a smooth flange is left between the ends of the corrugation 122 and the bead.

On the shafts 115 and 116, preferably the latter, carries any suitable means indicated at 116 whereby the said shaft may be rotated. Fixed on one end of the shaft 116 as shown in Fig. 1 is a gear wheel 142 meshing into a gear wheel 141 fixed to the end of the shaft 115. Thus the shafts are coupled up for simultaneous rotation. The gear wheel 142 meshes into an idle gear wheel 143 on a shaft 144 supported in one of the frame plates 102. The wheel 143 meshes into the gear wheel 41 on the shaft 39. It will now be obvious from a casual inspection of Fig. 1 how the bead forming rollers are all coupled up operatively with the corrugating rollers.

After the material has been beaded and corrugated and is in substantially the condition shown in Fig. 11, the material is received between a pair of back or guiding rollers. These guiding rollers are shifted vertically and their relative positions are changed, as may be necessary to shape the sheet properly so that the same will approximate the contour of the finished tank or receptacle. The sheet may be run out straight, when a straight sided tank is formed. It may be of curved form, or it may be a combination of the curved and straight shapes, the specific peripheral contour of the sheet being ultimately determined by the proper manipulation of a guiding means now to be described.

Journaled in the frame plates 102 is a shaft 125. Secured to the shaft 125 adjacent its ends are eccentrics 126. To one eccentric 126 is secured a lever 127. Arms 128 are provided, the same having straps 129 which surround the eccentrics 126. A shaft 130 is mounted in the upper ends of the arms 128. The shaft 130 carries a roller 131. Mounted on the ends of the shaft 130 are arms 132 each of which is provided at its upper end with a strap 133 adapted to receive an eccentric 134. One eccentric 134 is operated by a lever 135 and both carry a shaft 136 supporting a roller 137. The rollers 137 and 131 are grooved as at 138 to receive the bead on the strip or plate. The shafts 130 and 136 are received in bearings adjustable in guide slots 139 in the plates 102.

By manipulating the eccentric 126 through the medium of the lever 127, both rollers 137 and 131 will be raised and lowered. The upper roller which is carried by the eccentrics 134 may be raised and lowered with respect to the lower roller by rotating the eccentric through the medium of the lever 135. It will now be understood that the positions of the rollers 137 and 131 may be altered, vertically, either with respect to each other or, if desired, both rollers may be shifted at once vertically. Thus, the contour of the material as it passes from these rollers may be changed and altered, according to the peripheral outline of the completed tank or receptacle.

The operation of the structure has been dealt with step-by-step hereinbefore, but briefly considered is as follows:—The sheet to be beaded and corrugated is passed between the various rollers shown in Figs. 21 to 27 both inclusive, and by this operation, the bead is disposed substantially in the condition shown in Fig. 8. Then the bead is bent laterally until it stands at right angles to the body portion of the sheet, as shown in Fig. 9. This operation is brought about through the medium of the horizontal wheels 104 on the platform 103. Then, the sheet of material passes between the corrugated rollers 115 and 116 and is finished off substantially as shown in Fig. 11 of the drawings. The sheet then passes between the guiding rollers 131 and 137 and is bent approximately into the curvature which it is desired that it shall assume.

Having thus described the invention, what is claimed is:—

1. In a machine for shaping and bending sheets, a supporting structure having a guide; a first eccentric journaled on the supporting structure adjacent one end of the guide; a first bearing slidable in the guide at said end of the guide; a second bearing slidable in the guide at the other end of the guide; oppositely extended arms provided at their outer ends with straps, the strap of one arm coacting with the first eccentric; a second eccentric coacting with the strap of the other arm; a second shaft carried by the second eccentric and journaled in the second bearing; a first shaft forming a pivotal connection between the inner ends of the arms and journaled in the first bearing; means for operating the eccentrics individually; and coöperating sheet guiding elements carried by the shafts.

2. In a machine for beading sheets, a supporting structure including a substantially horizontal platform; a bead roller mounted for rotation in a plane parallel to the platform; a pair of superposed corrugating rollers journaled on the supporting structure to the rear of the bead roller; a pair of bending rollers disposed to the rear of the corrugating rollers; means for moving the bending rollers together transversely of the line of advance of the stock, and for moving one bending roller toward and away from the other bending roller transversely of the line of advance of the stock; a retaining roller disposed between the corrugating rollers and the bead roller and constituting means for holding the stock on the platform while the stock is passing to the corrugating rollers, the platform having a bead-receiving groove located near the periphery of the beading roller, the retaining roller, the corrugating rollers and the bending rollers being provided with bead-receiving grooves located in alinement with the groove of the platform; and means for partially completing a bead in a sheet and for advancing the sheet to cause the partially finished sheet to coact with the bead roller.

In testimony that we claim the foregoing as our own, we have hereto affixed our signatures in the presence of two witnesses.

GEORGE A. TRACHTE.
ARTHUR F. TRACHTE.

Witnesses:
 LOUISE UNTERHOLT,
 J. J. McMANAMY.